(12) United States Patent
Takemoto

(10) Patent No.: US 8,463,070 B2
(45) Date of Patent: Jun. 11, 2013

(54) IMAGE PROCESSING APPARATUS AND IMAGE PROCESSING METHOD

(75) Inventor: Takashi Takemoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 242 days.

(21) Appl. No.: 12/966,192

(22) Filed: Dec. 13, 2010

(65) Prior Publication Data

US 2011/0142360 A1 Jun. 16, 2011

(30) Foreign Application Priority Data

Dec. 15, 2009 (JP) ................. P2009-284316

(51) Int. Cl.
*G06K 9/36* (2006.01)
*G06F 17/00* (2006.01)

(52) U.S. Cl.
USPC .......................................... 382/276; 345/418

(58) Field of Classification Search
USPC ................. 382/166, 232, 243, 282, 305, 312, 382/173; 345/422–423, 502, 522, 557, 581, 345/589, 608, 629, 418
See application file for complete search history.

(56) References Cited

U.S. PATENT DOCUMENTS

| 6,204,856 | B1 * | 3/2001 | Wood et al. ................ 345/608 |
| 6,268,875 | B1 * | 7/2001 | Duluk et al. .............. 345/506 |
| 6,731,288 | B2 * | 5/2004 | Parsons et al. ............ 345/502 |
| 6,788,303 | B2 * | 9/2004 | Baldwin .................... 345/522 |
| 6,798,421 | B2 * | 9/2004 | Baldwin .................... 345/557 |
| 6,831,653 | B2 * | 12/2004 | Kehlet et al. .............. 345/558 |
| 7,330,195 | B2 * | 2/2008 | Li ............................. 345/629 |
| 8,184,118 | B2 * | 5/2012 | Brennan .................... 345/422 |
| 8,194,071 | B2 * | 6/2012 | Meinds ...................... 345/423 |
| 2008/0259076 | A1 | 10/2008 | Meinds |

FOREIGN PATENT DOCUMENTS

| JP | 2006-235926 A | 9/2006 |
| JP | 2007-304871 A | 11/2007 |

* cited by examiner

*Primary Examiner* — Kanjibhai Patel
(74) *Attorney, Agent, or Firm* — Sprinkle IP Law Group

(57) ABSTRACT

Provided are a rasterizer configured to convert a triangle TA formed with vertices VT to a group of pixels PX and then to divide the group of pixels PX into tiles TL; and a sorting buffer configured to store the group of pixels PX for each of the tiles TL.

7 Claims, 5 Drawing Sheets

IMAGE PROCESSING APPARATUS AND IMAGE PROCESSING METHOD

CROSS-REFERENCE TO RELATED APPLICATIONS

This Application is based upon and claims the benefit of priority from the prior Japanese Patent Application No. P2009-284316, filed on Dec. 15, 2009; the entire contents of which are incorporated herein by reference.

BACKGROUND

1. Field

Embodiments described herein relate generally to image processing apparatus.

2. Description of Related Art

According to the tile-based rendering method, a final image is generated by dividing the entire screen into plural rectangular regions (tiles), and then drawing images for the individual tiles independently. Hence, the method is known to be capable of significantly reducing the memory bandwidth of an external memory for an application with fewer vertices and capable of easily obtaining scalability in pixel performance by use of the multi-core technique.

Specifically, the operations up to vertex processing are firstly executed for a command list. Then, calculation is performed to identify which tiles each triangle formed with the vertices belongs to. Then, the vertices are sorted into the tiles on the basis of the calculation results. The processing to sort the vertices into the tiles is known as "sorting." The results of sorting are sequentially accumulated in the sorting buffer outside the graphics processing unit. Once the sorting for all draw commands is finished, the rasterizing and the pixel processing are executed for each of the tiles. The drawing of the image is completed when the pixel processing for all the tiles is completed.

Note that each tile has a limited number of pixels. For example, assuming that each pixel has 4 bytes, a tile of 32×32 pixels has a data size of 4 KB (=32×32×4 bytes) only. Hence, the data on each tile can be held in the tile buffer provided in the graphics processing unit. Accordingly, instead of the access to the frame buffer, only the access to the tile buffer is needed for the pixel processing. Thus, significant reduction can be achieved in the number of accesses to the memory outside the graphics processing unit. In addition, since the pixel processing is performed for each tile independently of the other tiles, parallel processing for plural pixels can be implemented easily.

The conventional tile-based rendering method, however, needs the sorting of the vertices into the tiles and the creating of a sorting list that indicates the association of the tiles with the vertices. Accordingly, particularly with a large number of vertices, the number of accesses to the sorting buffer outside the graphics processing unit is increased and the capacity of the sorting buffer is also increased. Such increases are problems that may probably nullify the advantages of the tile-based rendering method.

DETAILED DESCRIPTION

Figure 1:
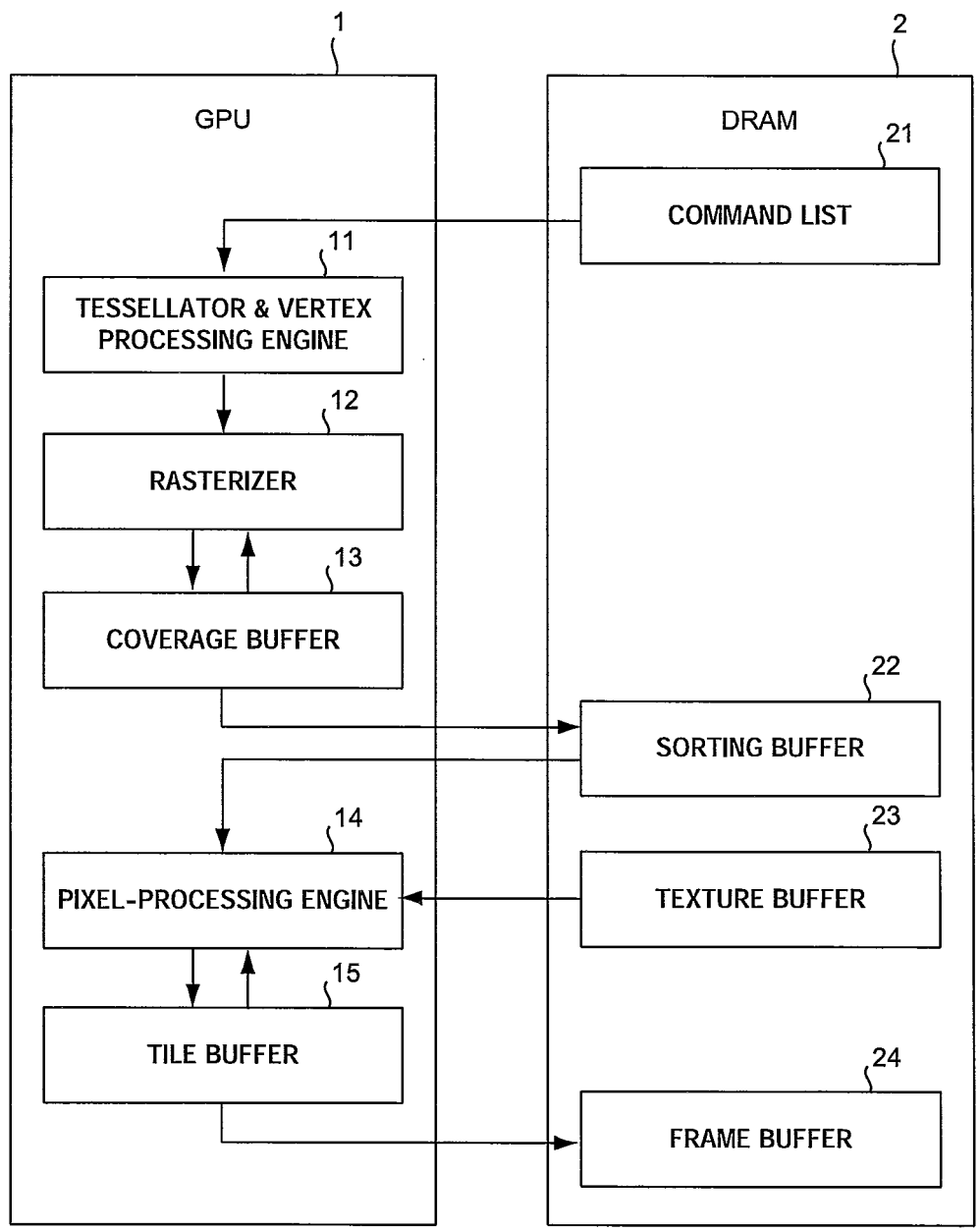
FIG. 1 is a block diagram illustrating the overall configuration of an image processing apparatus according to a first embodiment of the invention.

Image processing apparatuses of some embodiments of the invention are described below by referring to the drawings.

First Embodiment

FIG. 1 is a block diagram illustrating the overall configuration of an image processing apparatus according to a first embodiment of the invention.

FIG. 1 shows that the image processing apparatus includes a graphics processing unit (GPU) 1 and a DRAM 2. The GPU 1 includes a tessellator and vertex-processing engine 11, a rasterizer 12, a coverage buffer 13, a pixel-processing engine 14, and a tile buffer 15. The DRAM 2 stores a command list 21 and includes a sorting buffer 22, a texture buffer 23, and a frame buffer 24.

If the command list 21 designates a curved line, the tessellator and vertex-processing engine 11 converts the curved line to vertices. The tessellator and vertex-processing engine 11 performs also the coordinate transformation of the vertices of the triangles representing figures. Examples of coordinate transformation of the vertices include those associated with the rotation, downscaling, and upscaling of figures formed with vertices. The rasterizer 12 converts triangles formed with vertices into groups of pixels, and then divides the groups of pixels into tiles. The coverage buffer 13 stores the groups of pixels, divided into the tiles by the rasterizer 12, on a per-object basis collectively and continuously. Note that the above-mentioned "object" refers to any closed region for a drawing target. The object may contain a primitive (component). The object is broken down into either a single or plural basic shapes (e.g. triangles or the like), and then is rasterized. The pixel-processing engine 14 acquires the groups of pixels stored in the sorting buffer 22 for each tile on a per-object basis. The pixel-processing engine 14 then assigns attributes to the pixels thus acquired. The tile buffer 15 stores, for each tile, the information on the pixels assigned the attributes by the pixel-processing engine 14. The command list 21 stores draw commands and drawing data (starting points, ending points, control points). The drawing data in the command list 21 may be expressed in form other than raster form, such as vector form, for example. The sorting buffer 22 stores, for each of the tiles and on a per-object basis, the groups of pixels divided into tiles by the rasterizer 12. The texture buffer 23 stores the attributes of pixels assigned by the pixel-processing engine 14. Examples of the attributes of pixels include color, pattern, and texture. The frame buffer 24 stores, in raster form, the image data drawn in accordance with the command list 21.

Figure 2:
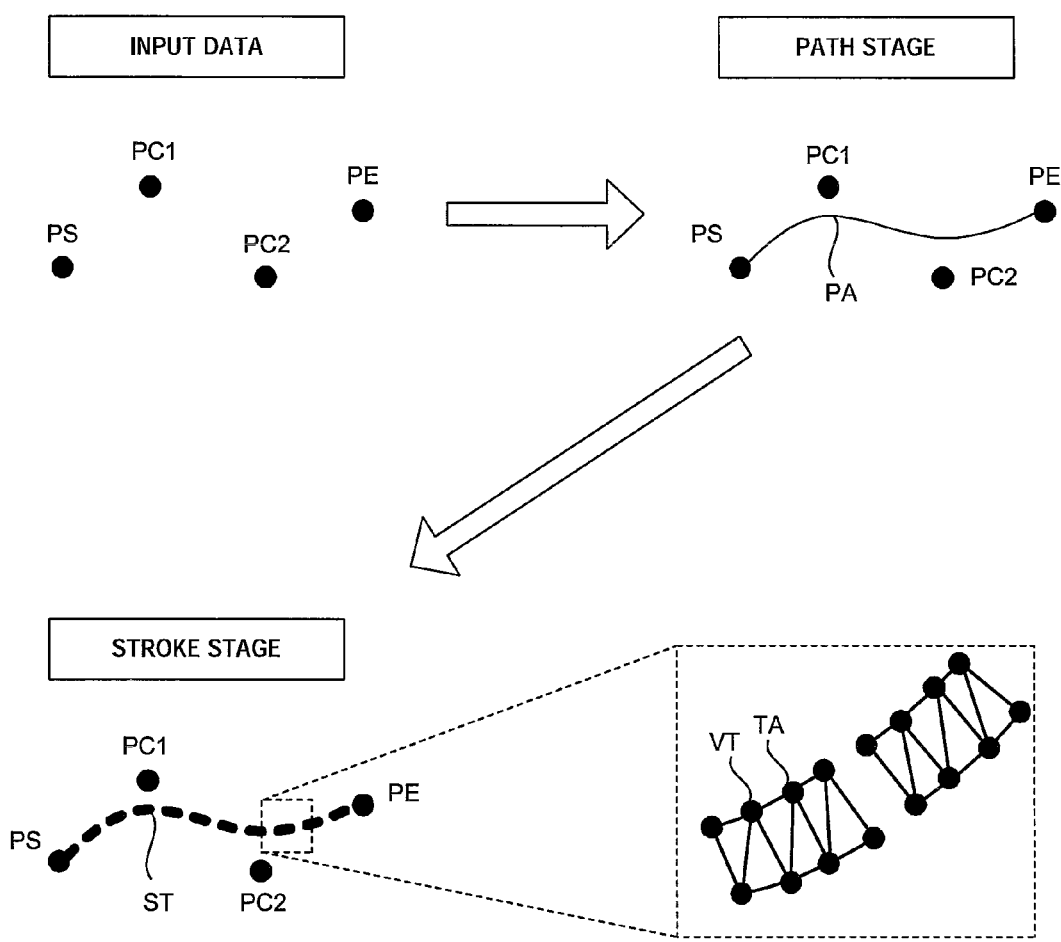
FIG. 2 is a diagram illustrating the overall processing executed by a tessellator and vertex-processing engine 11 shown in FIG. 1.
Figure 3:
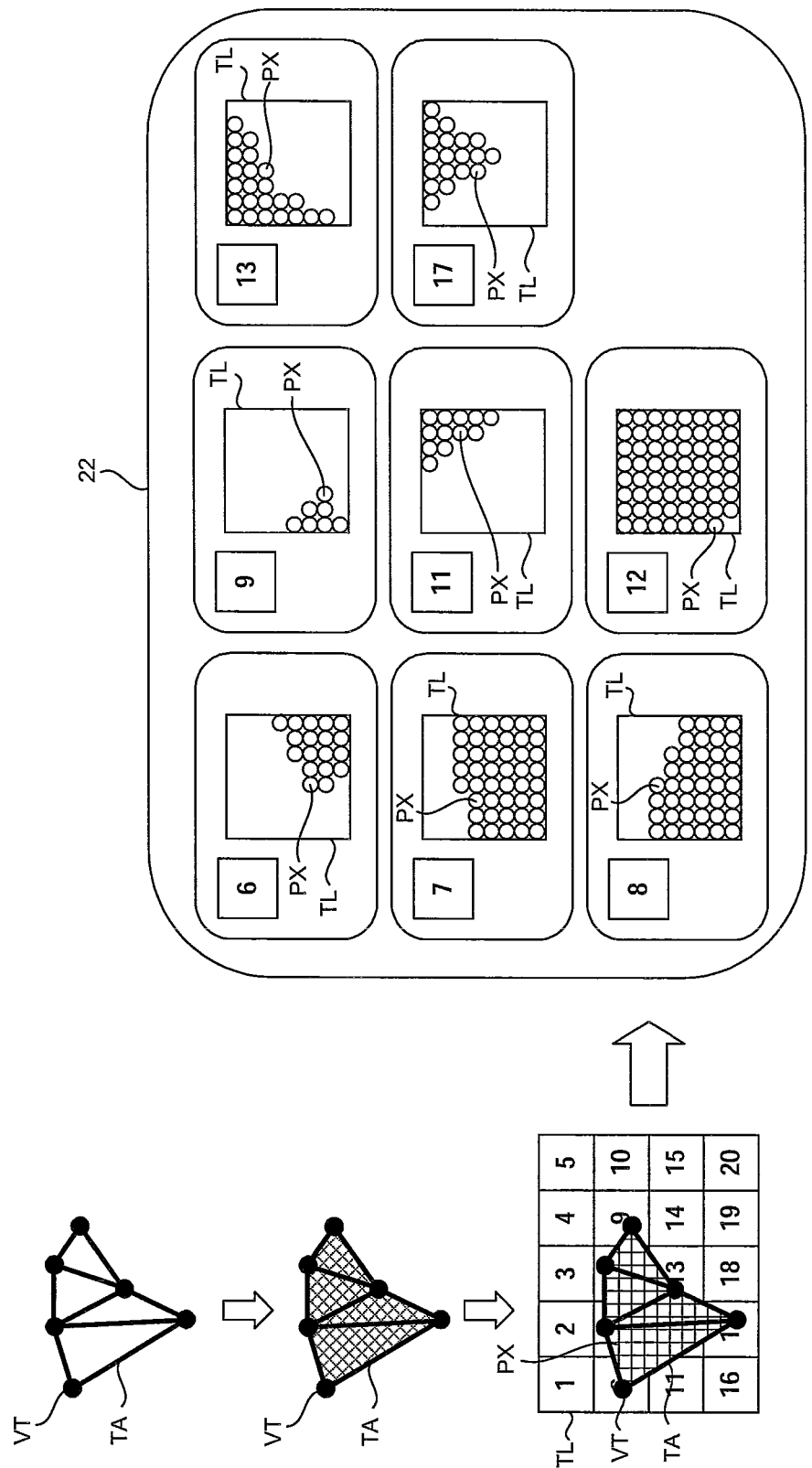
FIG. 3 is a diagram illustrating the overall processing executed in a rasterizer 12 and a coverage buffer 13 shown in FIG. 1.

The operations of the image processing apparatus shown in FIG. 1 are described by referring to FIGS. 2 and 3.

FIG. 2 is a diagram illustrating the overall processing executed by a tessellator and vertex-processing engine 11 shown in FIG. 1.

FIG. 2 shows that a starting point PS, an ending point PE, and control points PC1, PC2, and the like, are registered in the command list 21. All of these points are used to define a curved line PA. If a draw command and drawing data in the command list 21 are inputted into the tessellator and vertex-processing engine 11, a stroke ST is generated along the starting points PS, the ending points PE, and the control points PC1, PC2, and the like. Note that at the stroke stage, various kinds of lines with various shapes can be defined. The stroke ST once generated is converted into plural triangles TA that form the stroke ST. Then the vertices VT included in the triangles TA are subjected to the coordinate transformation, and the data on the coordinates of the vertices VT are inputted into the rasterizer 2. The command list 21 may store pointers used to access each vertex VT, or to access the coordinates of starting point PS, the ending point PE, and the control points PC1, PC2, and the like.

FIG. 3 is a diagram illustrating the overall processing executed in a rasterizer 12 and a coverage buffer 13 shown in FIG. 1.

FIG. 3 shows that the inputting of the data on the vertices VT into the rasterizer 12 causes the triangles TA formed with the vertices VT to be converted into groups of pixels PX, which are then divided into tiles TL. For example, a screen that draws the group of pixels PX can be divided into 20 tiles TL, namely from the first to the twentieth tiles TL. The size of each tile TL is, for example, 8×8 pixels. The resultant groups of pixels PX which are divided into the tiles TL are then stored in the sorting buffer 22 for each of the tiles TL.

Then, the pixel-processing engine 14 acquires, for each of the tiles TL, the groups of pixels which have been stored in the sorting buffer 22. Then, while the attributes of the pixels PX stored in the texture buffer 23 are allocated to the groups of pixels PX for each of the tiles TL thus acquired, the groups of pixels PX with the attributes are stored in the tile buffer 15. Then, every time the processing on the pixels PX included in a single tile TL is finished, the image data stored in the tile buffer 15 are stored in the frame buffer 24.

As FIG. 3 shows, the triangles TA formed with the vertices VT are converted into the groups of pixels PX, and then the groups of pixels PX are divided into the tiles TL. Hence, this tile-based rendering method can be performed without sorting each of the vertices VT that form the triangles TA into one of the tiles. Accordingly, even with a large number of vertices VT, this tile-based rendering can prevent an increase in the number of accessing the sorting buffer 22 outside the GPU 1 or an increase in the capacity of the sorting buffer 22.

For the processing of converting the triangles TA formed with the vertices VT into groups of pixels PX, the groups of pixels PX may be held in the coverage buffer 13 continuously within each single object, and the conversion into the groups of pixels PX in each single object may be executed collectively. In this case, the rasterizer 12 converts the triangles TA into coverages of pixels (mask pattern), and then the coverage buffer 13 gathers the coverages for each tile TL. The coverages thus gathered are then registered into the entry of the corresponding tile TL in the sorting buffer 22. Once the registration of the coverages for all the commands into the sorting buffer 22 is completed, the pixel-processing engine 14 picks up the tiles TL one by one from the sorting buffer 22 and executes the pixel processing for the picked-up tiles TL sequentially. For the coverage without anti-aliasing, one bit is allocated to each pixel, whereas for the coverage with anti-aliasing, bits of a number corresponding to a sampling number are allocated to each pixel.

Specifically, if an object is assigned 8 tiles TL and each tile includes 64 pixels, the size of the sorting buffer 22 needed for the object is 512 bits (=1 bit×64 pixels×8 tiles) only.

In addition, the tessellator and vertex-processing engine 11, the rasterizer 12, and the pixel-processing engine 14 may be implemented by making a computer execute programs describing the commands to execute the processings to be performed by each of these blocks.

In addition, if the programs are stored in a storage medium such as a CD-ROM, the processings to be performed by the tessellator and vertex-processing engine 11, the rasterizer 12, and the pixel-processing engine 14 can be executed by putting the storage medium into the computer of the image processing apparatus and installing the programs into the computer.

In addition, the programs in which a command is written to execute the processings to be performed by the tessellator and vertex-processing engine 11, the rasterizer 12, and the pixel-processing engine 14 may be run either by a single stand-alone computer or by plural computers that are connected to a network so as to perform distributed computing.

Second Embodiment

Figure 4:
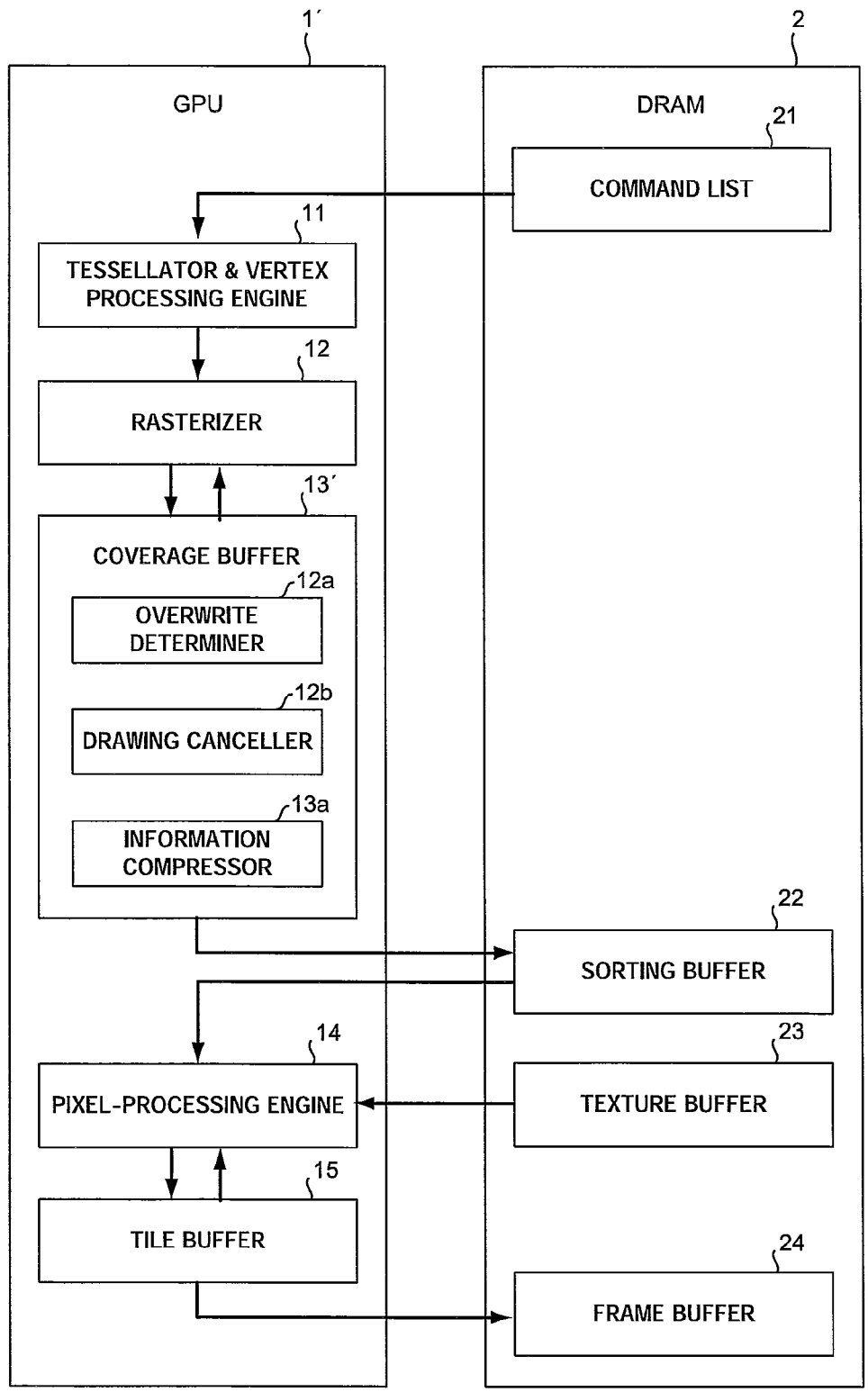
FIG. 4 is a block diagram illustrating the overall configuration of an image processing apparatus according to a second embodiment of the invention.

FIG. 4 is a block diagram illustrating the overall configuration of an image processing apparatus according to a second embodiment of the invention.

FIG. 4 shows that the image processing apparatus includes a GPU 1' instead of the GPU 1 shown in FIG. 1. The GPU 1' includes a coverage buffer 13' instead of the coverage buffer 13 shown in FIG. 1. The coverage buffer 13' includes an overwrite determiner 12a, a drawing canceller 12b, and an information compressor 13a.

The overwrite determiner 12a determines whether or not there is a tile TL where all the pixels PX are to be overwritten by the object to be drawn next. The drawing canceller 12b abandons the pixel information of the other objects that has been registered thus far for the tile TL where all the pixels are to be overwritten by the object to be drawn next. In addition, the overwrite determiner 12a omits the storing of such pixel information in the sorting buffer 22. The information compressor 13a compresses the information on tiles TL by assigning special codes to the tiles TL each of which is entirely filled with pixels PX and to the tiles TL each of which has no pixel PX at all.

Figure 5:
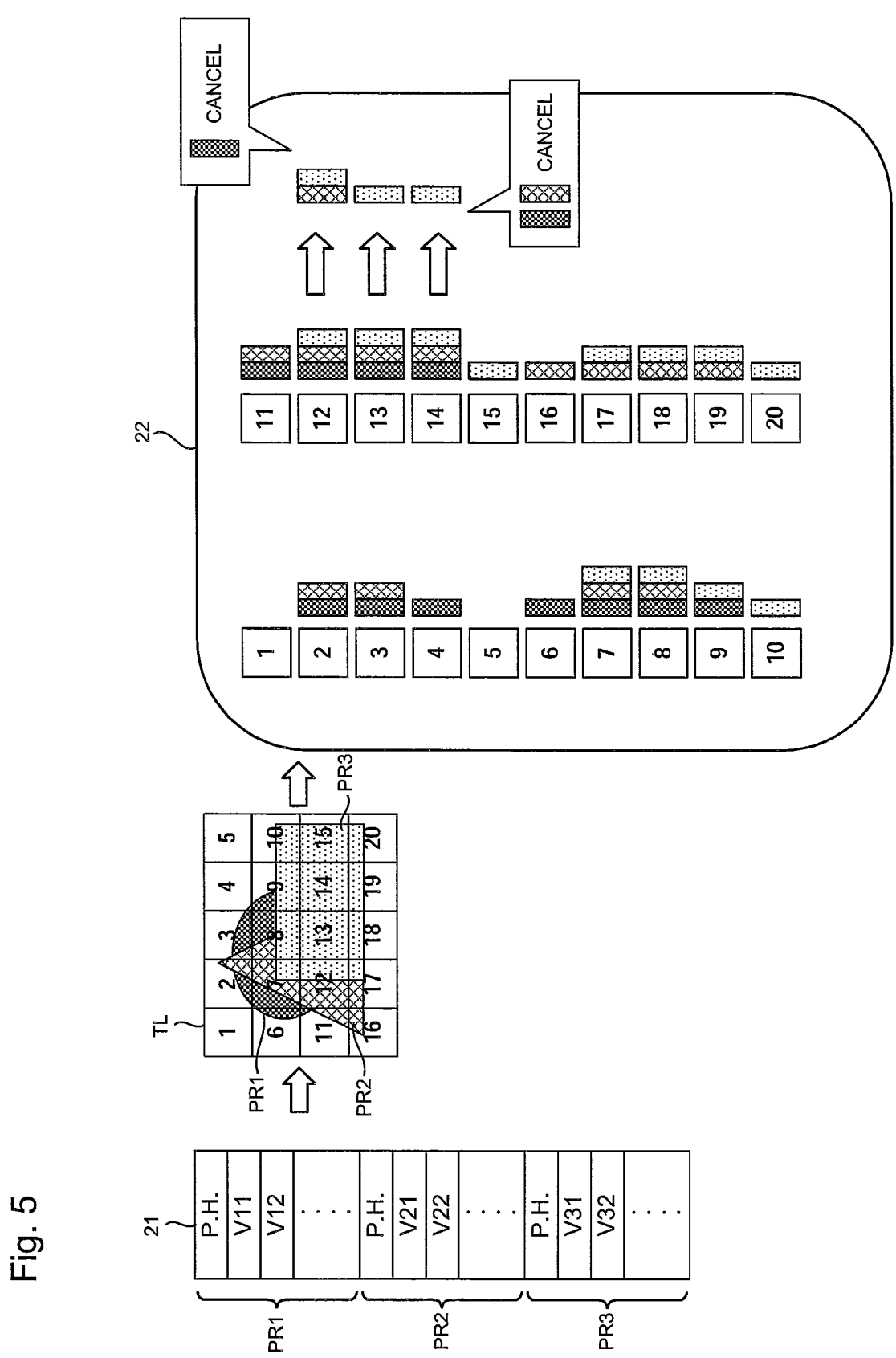
FIG. 5 is a diagram illustrating the processing executed by an overwrite determiner 12a and a drawing canceller 12b shown in FIG. 4.

FIG. 5 is a diagram illustrating the processing executed by an overwrite determiner 12a and a drawing canceller 12b shown in FIG. 4.

FIG. 5 shows data registered in the command list 21. Data on vertices V11, V12, . . . of an object PR1, data on vertices, V21, V22, . . . of an object PR2, and data on vertices V31, V32, . . . of an object PR3 are registered in this order. Note that the data on the objects PR1 to PR3 are not necessarily the coordinates of vertices. Specifically, for example, if the object is a curved line, the data on the object may be the coordinates of the starting point, the ending point, and each control point. Note that if plural objects, such as the objects PR1 to PR3, are registered in the command list 21, the GPU 1' draws the plural objects in accordance with the order in which the plural objects are registered in the command list 21. For example, the object PR1 that is registered first is drawn first, and the object PR1 may be overwritten by the objects PR2 and/or PR3 that are registered subsequently.

Once the command list 21 is inputted into the tessellator and vertex-processing engine 11, coordinate transformation for the vertices of the objects PR1 to PR3 are performed successively, and then, the rasterizer 12 generates groups of pixels PX for each of the objects PR1 to PR3. Then, the overwrite determiner 12a determines, for each of the tiles TL, whether or not all the pixels of the tile TL are overwritten by the groups of pixels PX. Note that, if the rasterizer 12 performs the overwriting determination, the unit for the overwriting determination is each triangle TA at best. The overwriting determination by the coverage buffer 13', however, is more efficient because the use of the information stored in the coverage buffer 13' allows each of the objects PR1 to PR3 to be the unit for the determination. In addition, the results of the overwriting determination can be used for the information compression processing that is to be performed by the information compressor 13a.

If the screen where the groups of pixels for the objects PR1 to PR3 are depicted is divided into 20 tiles TL, namely from the first to the twentieth tiles TL, the overwrite determiner 12a determines that, in the twelfth tile TL, all the pixels of the object PR1 are overwritten by the objects PR2 and PR3. In addition, the overwrite determiner 12a determines that, in the thirteenth and the fourteenth tiles TL, all the pixels of the objects PR1 and PR2 are overwritten by the object PR3.

Since the overwrite determiner 12a determines that all the pixels in the twelfth to the fourteenth tiles TL of the object PR1 would be overwritten by the objects PR2 and PR3, the drawing canceller 12b abandons the pieces of information on the object PR1 registered in the entries for the twelfth to the fourteenth tiles TL, and omits the processing to store, in the sorting buffer 22, the information on such pixels.

Since the overwrite determiner 12a determines that all the pixels in the thirteenth and the fourteenth tiles TL of the object PR2 would be overwritten by the objects PR3, the drawing canceller 12b abandons the pieces of information on the object PR2 registered in the entries for the twelfth to the fourteenth tiles TL, and omits the processing to store, in the sorting buffer 22, the information on such pixels.

Then, the pixel-processing engine 14 acquires, for each of the tiles TL, the groups of pixels of the objects PR1 to PR3 after the overwriting processing, and stores the acquired groups of pixels in the tile buffer 15 together with the attributes for those pixels stored in the texture buffer 23. Then, once the processing of the pixels of the objects PR1 to PR3 contained in each single tile TL is finished, the image data which have been stored in the tile buffer 15 are stored in the frame buffer 24.

If there is a tile TL where all the pixels of an object to be drawn earlier are to be overwritten by another object to be drawn later, the processing of the pixels for the object drawn earlier is cancelled in the tile TL. Hence, the pixel-processing engine 14 can skip wasteful pixel processing, and the loads on the GPU 1' can be alleviated.

In addition, once the coverage information on each pixel of the objects PR1 to PR3 is sent to the coverage buffer 13', the information compressor 13a generates flags indicating whether or not the tiles TL are entirely filled with the pixels PX generated by the rasterizer 12. Each of the flags is generated for each of the objects PR1 to PR3 and for each tile TL. The flags thus generated are stored in the sorting buffer 22.

Specifically, for each of the tiles TL that are filled entirely with the pixels PX generated by the rasterizer 12, a value '1' is stored in the flag individually for the objects PR1 to PR3; for each of the other tiles TL, a value '0' is stored in the flag. For the tiles TL without any pixel at all, the registration in the sorting buffer 22 is not done in the first place. If a value '1' is stored in the flag, the pieces of information on the other objects PR1 to PR3 that have been registered thus far in the entry of the tile TL are abandoned, and the storing of the pixel information in the sorting buffer 22 is omitted.

Specifically, since no pixels PX is drawn in any of the first to the fifth tiles TL shown in FIG. 5, no registration in the sorting buffer 22 is performed for these tiles TL. Each of the thirteenth and the fourteenth tiles TL shown in FIG. 5 is entirely filled with the pixels PX of the object PR3. In this case, when the tile TL of the object PR3 is registered in the sorting buffer 22, the pieces of information on the objects PR1 and PR2 are deleted from the entries of those tiles TL, and only the pieces of flag information on the object PR3 are stored in the entries of those tiles TL.

Accordingly, the coverage information is compressed and then stored in the sorting buffer 22, so that the memory bandwidth of the external memory and the memory capacity thereof can be reduced.

Note that, according to the method described in the case of FIG. 4, both the overwrite determiner 12a and the drawing canceller 12b are located in the coverage buffer 13'. It is, however, possible that the overwrite determiner 12a and the drawing canceller 12b is located in the rasterizer 12, between the coverage buffer 13' and the sorting buffer 22, or between the rasterizer 12 and the coverage buffer 13'.

In addition, according to the method described in the case of FIG. 4, the information compressor 13a is located in the coverage buffer 13'. It is, however, possible that the information compressor 13a is located between the coverage buffer 13' and the sorting buffer 22.

In addition, the information compression method described in the second embodiment is concerned with tiles TL that are entirely filled with pixels or that have no pixels at all. It is, however, possible that by considering the coverage information as a binary image, the binary-image compression technique is applied to the tiles TL that are partially filled with pixels.

In addition, according to the method described in the second embodiment, the overwrite determiner 12a, the drawing canceller 12b, and the information compressor 13a are added to the configuration of the first embodiment shown in FIG. 1. It is, however, possible that only the overwrite determiner 12a and the drawing canceller 12b are added to the configuration of the first embodiment shown in FIG. 1. Still alternatively, only the information compressor 13a may be added to the configuration of the first embodiment shown in FIG. 1.

What is claimed is:

1. An image processing apparatus comprising:
    a rasterizing processor configured to convert a figure designated by a draw command to a group of pixels and then, after the figure is converted to the group of pixels, to perform a processing of dividing the group of pixels into tiles;
    a sorting buffer configured to store the group of pixels for each of the tiles on a per-object basis;
    a pixel processor configured to acquire, for each of the tiles, the group of pixels stored in the sorting buffer and then to assign an attribute to each of the pixels thus acquired; and
    a tile buffer configured to store, for each of the tiles, the information on the pixels assigned the attributes by the pixel processor.

2. The image processing apparatus according to claim 1, further comprising a coverage buffer configured to store the groups of pixels, which are divided into the tiles by the rasterizer, collectively on a per-object basis.

3. The image processing apparatus according to claim 2 wherein the coverage buffer includes:
    an overwrite determiner configured to determine whether or not there is a tile where all the pixels of the tile are to be overwritten by another object to be drawn; and
    a drawing canceller configured to, for a tile where all the pixels are to be overwritten by an object to be drawn, abandon the pixel information on the certain object registered in the tile.

4. The image processing apparatus according to claim 3, wherein
   the coverage buffer includes an information compressor, and
   the information compressor compresses the information on the tile which is entirely filled with the pixels or which has no pixels at all, and then stores the compressed information in the sorting buffer.

5. An image processing method comprising the steps of:
   loading a draw command from a memory;
   performing a rasterizing processing to convert a figure designated by the draw command to a group of pixels and then, after the figure is converted to the group of pixels, dividing, the group of pixels into tiles;
   storing the group of pixels for each of the tiles on a per-object basis;
   acquiring the stored group of pixels for each of the tiles and assigning an attributes to each of the pixels; and
   storing, for each of the tiles, information on the pixels assigned the attributes.

6. The image processing method according to claim 5 further comprising the steps of:
   storing collectively the groups of pixels, which are divided into the tiles by the rasterizer, collectively on a per-object basis;
   determining whether or not there is a tile where all the pixels of the tile are to be overwritten by another object to be drawn; and
   for a tile where all the pixels are to be overwritten by an object to be drawn, abandoning the pixel information on the certain object registered in the tile.

7. The image processing method according to claim 5, wherein after the rasterizing processing,
   information on a tile which is entirely filled with the pixels or which has no pixel at all is compressed.

* * * * *